US007467206B2

(12) United States Patent
Moore et al.

(10) Patent No.: US 7,467,206 B2
(45) Date of Patent: Dec. 16, 2008

(54) REPUTATION SYSTEM FOR WEB SERVICES

(75) Inventors: George Moore, Issaquah, WA (US); Lucius Gregory Meredith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/328,714

(22) Filed: Dec. 23, 2002

(65) Prior Publication Data
US 2004/0122926 A1 Jun. 24, 2004

(51) Int. Cl.
*G06F 15/173* (2006.01)
(52) U.S. Cl. .................. 709/225; 709/228; 709/230
(58) Field of Classification Search .......... 709/226, 709/228, 230, 225
See application file for complete search history.

(56) References Cited

U.S. PATENT DOCUMENTS

| 5,550,746 | A | 8/1996 | Jacobs |
| 5,758,070 | A | 5/1998 | Lawrence |
| 5,841,981 | A | 11/1998 | Kondod |
| 6,336,956 | B1 | 4/2002 | Krishnan |
| 6,430,546 | B1 | 8/2002 | Stewart et al. |
| 6,542,964 | B1 * | 4/2003 | Scharber ............ 711/122 |
| 6,583,348 | B2 | 6/2003 | Hasegawa et al. |
| 7,143,139 | B2 * | 11/2006 | Burbeck et al. ......... 709/206 |
| 2002/0046041 | A1 * | 4/2002 | Lang .................. 705/1 |
| 2002/0133365 | A1 | 9/2002 | Grey et al. |
| 2002/0194112 | A1 | 12/2002 | dePinto et al. |
| 2003/0200205 | A1 * | 10/2003 | Meiresonne ............. 707/3 |
| 2003/0208533 | A1 | 11/2003 | Farquharson et al. |
| 2003/0208578 | A1 | 11/2003 | Taraborelli et al. |
| 2003/0217059 | A1 * | 11/2003 | Allen et al. ............ 707/10 |

(Continued)

FOREIGN PATENT DOCUMENTS

EP 0767565 4/1997

OTHER PUBLICATIONS

National Science Digital Library: Bibliographical Data of the Paper "Conceptual Model of Web Service Reputation" Retrieved from the Internet: URL:http://nsdl.org/resource/2200/20061122233126381T [retrieved on Oct. 30, 2007].

(Continued)

*Primary Examiner*—John Follansbee
*Assistant Examiner*—Nghi V Tran
(74) *Attorney, Agent, or Firm*—Workman Nydegger

(57) ABSTRACT

A system and method for automating the web service selection based on reputation information, to help negotiate a contractual web service binding between a client and a server. Reputation information may be schematized into behavioral attributes such as web service responsiveness, web service latency, web service uptime, cost data, business solvency and other trustworthiness and business-related data. Some of the reputation data may be empirically determined, and provided by an independent or other trusted auditor. In one implementation, a client queries a search engine, which returns a ranked list of web services, with the ranking based on reputation scores computed for each web service as collected by an auditor. Clients may provide computational data to weigh the attributes separately. A corporate internet can maintain reputation data for web services to act as an auditor, and a web service server can also execute trusted code to act as an auditor.

59 Claims, 6 Drawing Sheets

U.S. PATENT DOCUMENTS

| | | | |
|---|---|---|---|
| 2003/0236700 | A1 | 12/2003 | Arning et al. |
| 2004/0049541 | A1* | 3/2004 | Swahn .................. 709/203 |
| 2004/0064428 | A1* | 4/2004 | Larkin et al. ............ 707/1 |
| 2004/0083127 | A1* | 4/2004 | Lunsford et al. ......... 705/10 |
| 2004/0093518 | A1* | 5/2004 | Feng et al. ............. 713/201 |
| 2004/0186738 | A1* | 9/2004 | Reisman ................. 705/1 |
| 2004/0199419 | A1* | 10/2004 | Kim et al. ............. 705/14 |
| 2005/0187827 | A1* | 8/2005 | Weiss et al. ............ 705/22 |
| 2006/0259320 | A1* | 11/2006 | LaSalle et al. ........... 705/1 |

OTHER PUBLICATIONS

Maximilien, Michael E., "Reputation and Endorsement for Web Service" Conference Proceedings—Sigecom Exchanges, [Online] Feb. 2002, Retrieved from the Internet: http://people.engr.ncsu.edu/mpsingh/papers/#Trust [retrieved on Oct. 30, 2007].

Sreenath, Raghuram, et al. "A Community-Based Rating System for Selecting Among Web Services" Nov. 21, 2002, Department of Computer Science, North Carolina State University, Raleigh, NC 27695, Retrieved from the Internet: http://www.lib.ncsu.edu/theses/available/etd-12042002-151842/unrestricted/etd.pdf [retrieved on Oct. 30, 2007].

Menasce. Daniel A. "QoS Issues in Web Services" IEEE Internet Computing, IEEE Service Center, New York NY, US, vol. 6, No. 6, Nov. 2002, pp. 72-75.

Conti, Marco, et al. "Quality of Service Issues in Internet Web Services Issues in Internet Web Services" IEEE Transactions on Computers, vol. 51, No. 6, Jun. 2002, Retrieved from the Internet: http://csd12.computer.org/persagen/DLAbsToc.jsp?resourcePath=/dl/trans/tc/&toc=comp/trans/tc/2002/06/t6oc.xml&DOI=10.1109/TC 2002.1009145. [retrieved on Oct. 30, 2007].

User's Manual for the Netgear Dual Band Wireless PC Card 32-bit CardBus WAG511, Netgear, Inc., Sep. 2004, 202-10041-01, Version 2.0, p. C-8.

Anonymous, International Search Report Corresponding EP Application No. PCT/US03/3854.

Mui, Mohtashemi and Halberstadt, "Notions of Reputation in Multi-Agent systems: a Review." AAMAS'02 Jul. 15-19, 2002, Bologna, Italy. pp. 280-287.

* cited by examiner

REPUTATION SYSTEM FOR WEB SERVICES

FIELD OF THE INVENTION

The invention relates generally to computer systems and networks, and more particularly to web services.

BACKGROUND OF THE INVENTION

There are many types of computing services, resources and data that computer users and applications need to manage and otherwise access, such as services and data maintained locally, and data maintained on corporate networks and other remotely accessible sites including intranets and the internet. The concept of web services is generally directed to providing a computing service to clients via protocols and standards that are cross-platform in nature. For example, web services provides the basic tools for wiring the nodes of a distributed application together, regardless of the type of platform on which the requesting client is running.

As there are many different computing platforms, various platform-independent mechanisms and protocols that facilitate the exchange of network information are becoming commonplace, including HTTP (HyperText Transfer Protocol), XML (eXtensible Markup Language), XML Schema, and SOAP (Simple Object Access Protocol) XML. The concept of web services, in which businesses, organizations, and other providers offer services to users and applications, is presently based on these standards.

To be of value, web services need to enable users and applications to locate them, and exchange the information needed to execute them. To this end, UDDI (Universal Description Discovery and Integration) provides a set of defined services (e.g., in a universal business registry) that help users and applications discover such businesses, organizations, and other web services providers, along with a description of their available web services and the technical interfaces needed to access those services.

At present, the number of available web services is relatively small, and thus individuals are able to make manual connections between the consumers and providers of web services. Various mechanisms exist or are being developed for locating a type of web service that matches a consumer's given requirements, such as contract requirements detailed in a list of attributes dealing with the required interfaces, including ordering, timing, and resource usage. UDDI-based technology and recent improvements allow narrowly-defined, automated searches of web services, However, as the number of web services scales to the millions, as is likely, the results of such searches may include hundreds or thousands of web services that match a client's criteria. There needs to be an automated way for the client to select a web service from a smaller subset of the many thousands that match.

Ranking retrieved web services by popularity, even if possible, would be a poor model outside of a tightly-controlled network, and thus would be relatively inappropriate for ranking web services made available on the Internet. First, unlike simple web site access, in which the web leaves indelible, highly public link traces, web services, by their very nature, do not leave such traces. Moreover, even if mechanisms were put in place to record traces of web service usage, privacy concerns would become an issue, as an individual's or enterprise's operational practices would be determinable from those traces. Further, operators of specific web services would be inclined to inflate their actual popularity in order to attract new customers, essentially to give themselves a higher ranking in the list of search results based on popularity. Search engine operators might also vary the order of the results, essentially selling higher rankings to web service providers that are willing to pay for an inflated rank, even when their service does not best match a consumer's needs. Moreover, consumers of web services might attempt to deceive others as to the popularity of certain web services, preferring to keep the more responsive web services as a secret from competitors, while perhaps encouraging their competitors to use more unreliable web services.

In sum, what is needed is an automated system for ranking web services that is beneficial to consumers and best matches the consumer's needs. Unlike a popularity-based model, the system needs to be largely impervious to deceptive practices, so that actual ratings cannot be significantly manipulated.

SUMMARY OF THE INVENTION

Briefly, the present invention provides a system and method for automating the selection of a web service or other resource based on reputation information. Reputation information is schematized into behavioral attributes, including that are technically-oriented and business-oriented. Technical results may comprise service-level agreement items that can be observed by a third party as empirical data, such as web service responsiveness, web service latency, and web service uptime. Business-oriented behavioral attributes are those which indicate the business model and reliability of the company that is offering the web service. Such attributes may include cost data, solvency data, the identity of the entity that audits the company, the digital certificates that the company and/or auditor has, privacy policies, the identity of the entity that verifies the company's privacy policy, and other references.

In one implementation, a client queries a search engine, which returns a ranked list of web services, with the ranking based on reputation scores computed for each web service. To this end, an auditor collects the reputation data, and provides it to the search engine. The search engine caches contract data and reputation data, and the client provides contract requirements and reputation requirements, such as with the query. The search engine crawls the contract data to determine which web services meet the basic operational requirements of the client, and crawls the reputation data to determine which of those contract-meeting web services have the best reputations. The search engine may use a ranking mechanism to compute scores for each web service based on reputation scores provided by the auditor. The computed reputation scores may be verified with the auditor and web service providers, e.g., for a subset of the top-ranked web services.

The reputation scores for each web service may be categorized, such as to correspond to the various behavioral attributes, and the client may provide computational data to weigh the attributes separately. The client may specify how reputation requirements are to be met for a category, e.g., exactly or as falling into an acceptable range. A client need not specify each reputation requirement, whereby by default an omitted category will not be a factor in the ranking.

In another implementation, a corporate internet can maintain reputation data for web services and thereby act as its own auditor. The corporate internet implementation can select web services on its own, or by working in conjunction with the search engine-based, independent auditor-based computing environment generally described above. A web service server can also execute trusted code to act as an auditor, and operate in another implementation, or in the above-described implementations.

Other advantages will become apparent from the following detailed description when taken in conjunction with the drawings, in which:

DETAILED DESCRIPTION

Exemplary Operating Environment

Figure 1:
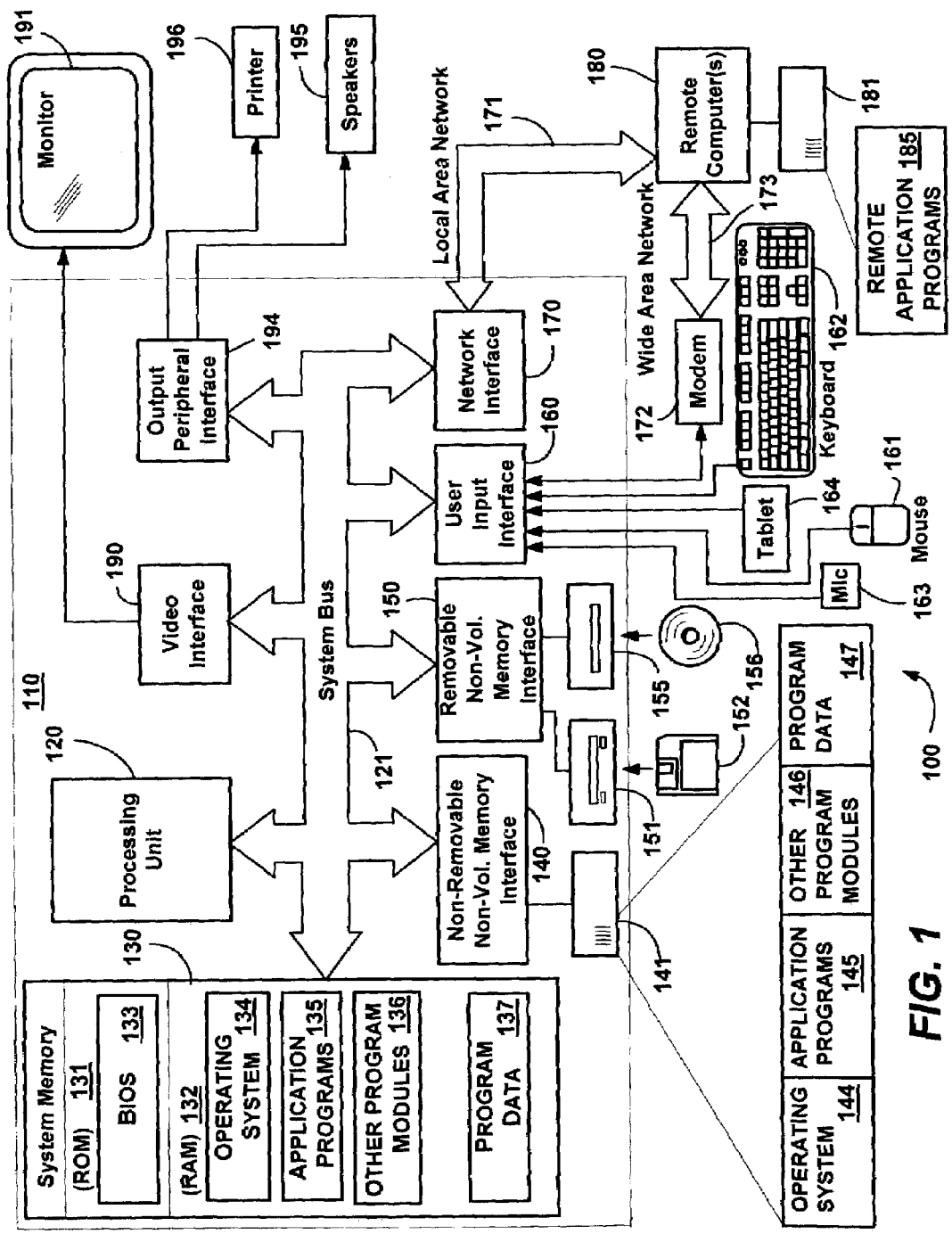
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Reputation for Web Services

The present invention is, in part, directed towards locating a web service, in which a client consumer requests a server provider to perform some service for the client, and provide the client with an appropriate response. The request and response are via one or more platform-independent protocols, whereby virtually any client can communicate with virtually any server regardless of their respective platforms.

Figure 2:
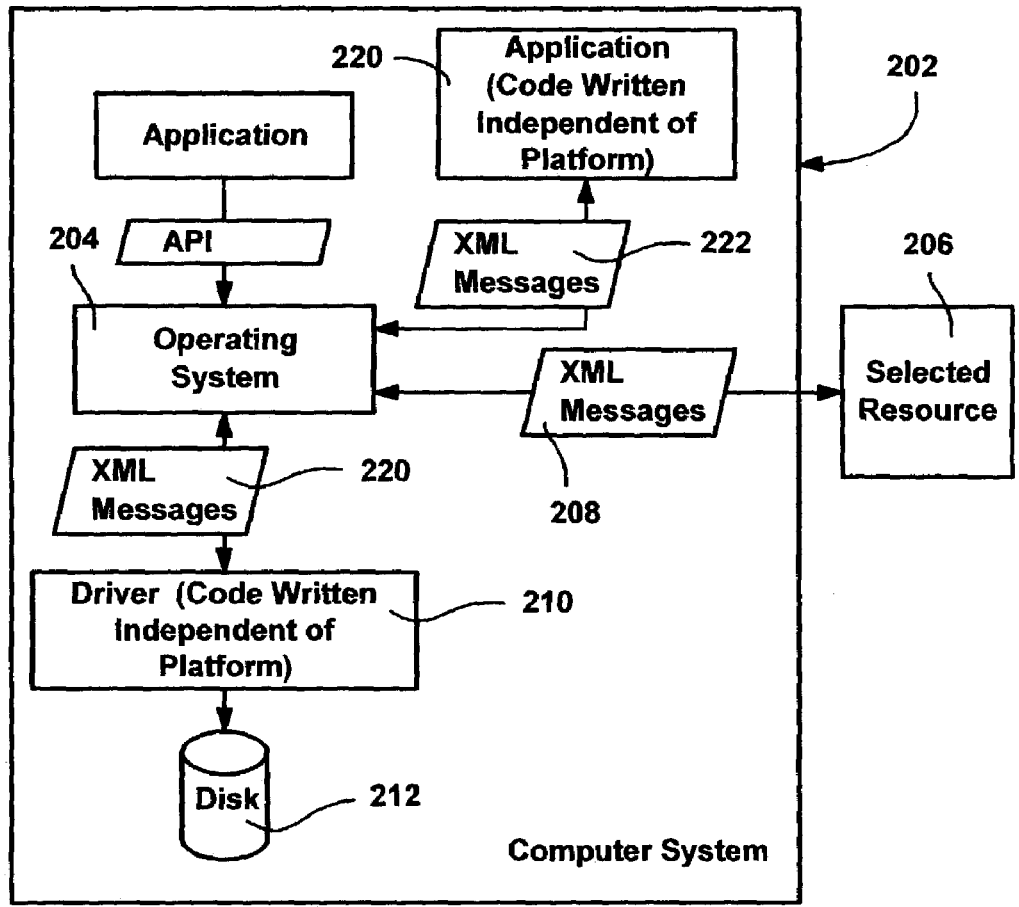
FIG. 2 is a block diagram generally representing a computer system arranged to communicate with resources in a platform-independent manner, in accordance with an aspect of the present invention.

As will be understood, however, the general web service model based on platform-independent protocols is not limited to a server running software for a client, but applies to any resource that a client wants to access. For example, in the near future, hardware will likely be componentized to an extent, and in many ways will be virtually indistinguishable from software-oriented web services, in that a user may select a set of hardware components and interconnect them via platform-independent communication protocols to perform a computing task. For example, a user may use a pocket-sized personal computer to dynamically connect to a physically separate storage device and a set of speakers (with associated amplifier), retrieve music off of the storage device and convert the music to appropriate signals that are sent to the speakers to play the music. As long as each device obeys the communication protocols, (and the appropriate amount of bandwidth is available), virtually any authorized device will be able to communicate data with another device to use its resources. FIG. 2 represents a client computer system 202 (e.g., which may be the computer system 110 of FIG. 1) having its operating system 204 communicating with a selected external resource 206 via a platform-independent protocol, e.g., XML-formatted messages 208 or the like.

Moreover, it is expected that hardware and software components normally considered as part of a single computer system, such as a monitor, mouse, keyboard, disk drive and/or virtually any device that has a conventional device driver for interfacing a hardware device to software, can instead communicate data via platform-independent protocols in a similar manner. Thus, for example, as generally represented in FIG. 2, a hard disk drive manufacturer will not need different device drivers for each computing platform, but instead can write a single device driver 210 for a given hard disk 212 that adheres to an appropriate platform-independent protocol (e.g., XML-formatted messages 212). Similarly, an application program 220 need not be programmed with knowledge of a platform's function calls, but can instead be written to pass platform-independent messages 222 to the operating system 204, and thereby be compiled for any platform.

Thus, although one aspect of the present invention is primarily described with reference to what are conventionally considered as web services, the present invention is generally directed towards locating any resource, be it a software-based web service, remote device, or internal software or hardware that a client wants to use. As such, the term "resource" and "web service" are equivalent as used herein, e.g., external hardware devices and software, and internal software or hardware components can also be considered web services.

Figure 3:
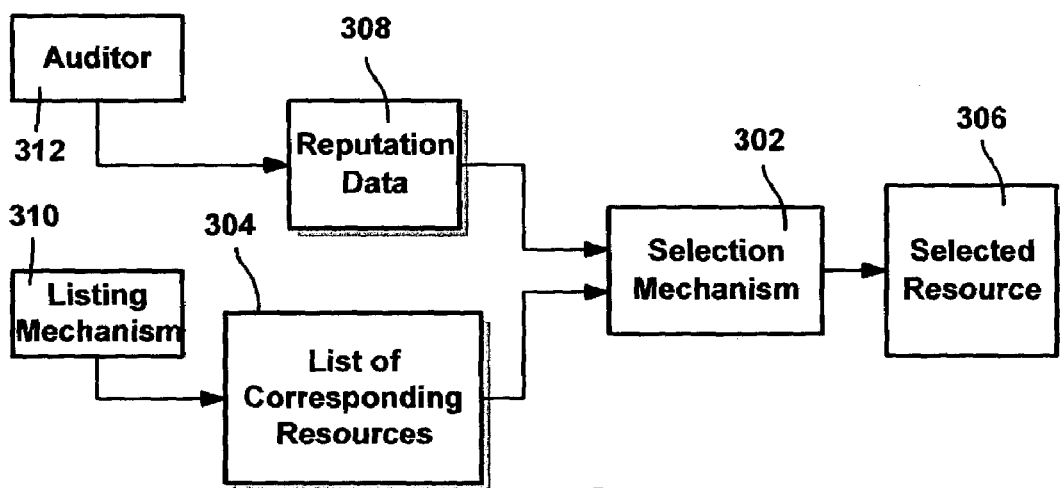
FIG. 3 is a block diagram generally representing the selection of a resource based on reputation data, in accordance with an aspect of the present invention.

As generally represented in FIG. 3, one aspect of the present invention is directed towards selection of a resource (from among a plurality of available resources that otherwise match a client's needs) based on the resource's reputation. To this end, a selection mechanism 302 selects a resource from a list 304 (or other suitably arranged data) and narrows the list to a selected resource 306 based on reputation data 308. The list may be maintained by a listing mechanism 310 that is internal or external to a computer requesting selection, and the reputation data provided by an internal or external auditor 312. Note that some or all of the components of FIG. 3, including the selection mechanism 302, may execute in the computer system 202 of FIG. 2, may execute external to it, or be distributed among internal and external components, and the selected resource 306 may be one of the resources shown in FIG. 2, e.g., the disk driver/disk 210, 212, the external hardware or software resource 206, the application 200, or some other resource. For example, as described below, part of a set of web services may be narrowed into a subset of web services by a selection mechanism component in a search engine, and that subset narrowed to one web service by a selection mechanism in a client.

The reputation data 308 essentially establishes how good and/or appropriate an otherwise suitable resource (web service) is for a given computing task that a client wishes to perform. As will be understood, the present invention complements the concept of a contract, which is the basis for finding a set of (possibly many) web services that matches the client's basic operating requirements for a type of web service, that is, contracts determine whether a web service will work with the client. Such requirements may include the interfaces to call, timing relationships, and specifications for freeing the resource when finished. Contracts are generally described in U.S. patent application Ser. No. 10/262,551, assigned to the assignee of the present invention and hereby incorporated by reference.

In accordance with an aspect of the present invention and described below, from the set determined by matching the client's contract requirements with a web service's contract offerings, the client ultimately chooses one web service to use based on reputation data. In other words, highly-detailed contract matches on specific web service interface definitions allow for global searches of web service providers. When, as is typical, the search results comprise more than one such resource that matches the specified contract requirements, the client needs to select one from the search results. The present invention provides a system and method for selecting a resource by filtering and/or ranking the search results via reputation data.

To this end, reputation data may be schematized and empirically determined, and may include behavioral attributes, including behavioral attributes both technically-oriented and business-oriented. For example, technical results may comprise service-level agreement items that can be observed by a third party as empirical data, such as responsiveness, which may be established by how often a web service reads from a specific port; latency, which may be established by a guaranteed not-to-exceed latency for the results of a specific operation, and uptime, which may specify how often has a site or device has been observed as available (or unavailable) for use, and at what times of the day.

Examples of business-oriented behavioral attributes are those having metrics that a requesting client may use to ascertain the business model and reliability of the company that is offering the web service. Such attributes may include whether there is a monetary cost to using a web service, or whether it is offered for free, (e.g., in support of some other business, such as a web service provided for submitting a purchase order). The cost, if any, generally may be encoded as cost per port per transaction serviced. Other business oriented-information may include financial and trustworthiness-type data, e.g., some indication as to how solvent is the company providing the desired web service, the identity of the entity that audits the company, the digital certificates that the company and/or auditor has, the privacy policies the company has in place, and the identity of the entity that verifies the policy, e.g., to determine who has audited the company's privacy policy certificate. Still other business oriented-information may include references, e.g., digital certificates of other customers, who in turn have their own reputation scores that may be queried to validate their trustworthiness.

With this data, the present invention provides a system and method for automating the selection of a web service based on reputation information. More particularly, as described below, in one implementation a requesting web service consumer may use reputation scores to filter and/or rank a list of search results that is initially obtained by matching the consumer's contract requirements. When ranking, the various scores for each behavioral attribute category may be given different weights. For example, if a particular requesting consumer cares most about cost, that consumer may give the cost category more weight than other categories, and thereby have the search results ranked differently from another consumer that is more concerned with low latency. Note that as described below, the filtering and/or ranking need not be actually performed by the client, but instead may be performed by a server on behalf of the client.

Figure 4:
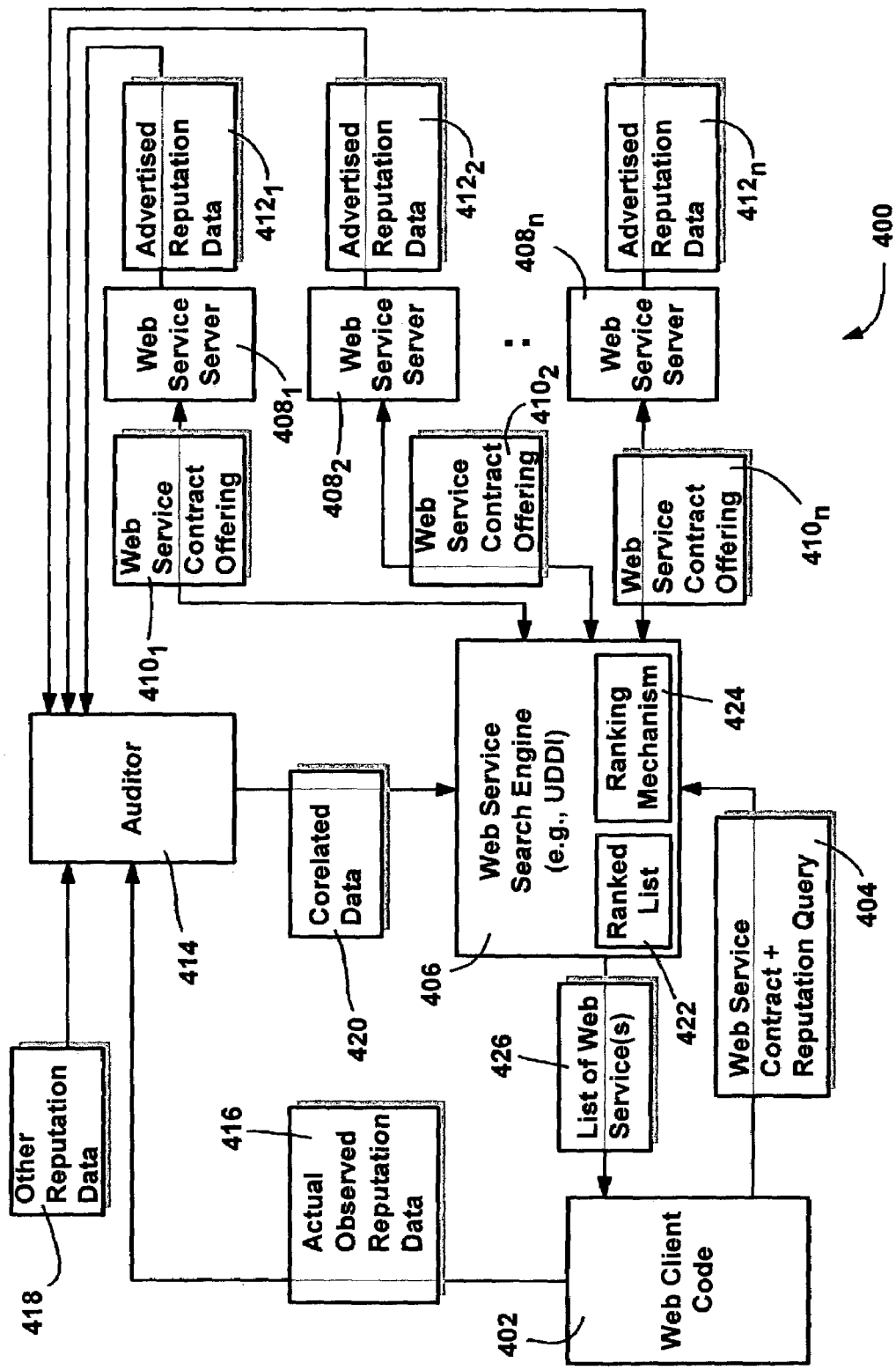
FIG. 4 is a block diagram generally representing components in a distributed system for automatically locating web services based on reputation data, in accordance with an aspect of the present invention.

FIG. 4 represents one alternative, example implementation of a distributed reputation system arranged in accordance with an aspect of the present invention. In FIG. 4, web client code 402 passes specific web services contract and web services reputation requirements in a query 404 to a web services search engine 406, e.g., a UDDI search engine. To this end, in one example implementation, a rich query language referred to as xSpresso provides a mechanism for client code 402 to pass in specific contract and reputation query terms for matching and sorting by a UDDI search service, e.g., the search engine 406. Further, an xSpresso query enables different weights to be specified for reputation categories. In general, xSpresso (described in U.S. provisional patent application Ser. No. 60/379,864, filed on May 10, 2002 and nonprovisional patent application Ser. No. [not yet available], filed on Nov. 22, 2002, herein incorporated by reference) is directed to a programming language and runtime that brokers control and data flows among asynchronous system components. Among other things, xSpresso expresses the cooperative dimensions of programs or services, including ordering and timing, which can be programmatically verified. The language may programmatically express the passing of an organizational scheme formed from a customizable tag-based language such as XML.

In the xSpresso code example below, a query is passed to a UDDI server (e.g., the search engine 406) to request a search ordering returned by the FindService query. In the example, the query is specifically interested in matching the specific contract details, along with reputation data. The reputation data specifies a web service provider having a minimum uptime requirement of 99.995 percent, a cost not to exceed $0.0005 per port per transaction, and a company that have been reviewed by WXYZ financial reviewing company:

```
//
// Finds a web service given a port s for talking to the search engine
// and a port c containing the contract to search for, and returns the
// top-ranked result at the port result
//
schedule FindWebService (   s : WebServiceSearchEngine,
                            c : aContract,
                            result : aProvider) {
    // create a place to put the result
    new ( resultList : WebServiceSearchResultList ) {
        parallel {
            c[ (theContract^ : ~ContractType) { } ];  // get the contract
                                                     // send to s a query
            s [ ( ["FindService",                    // called FindService
                   theContract,                      // passing the contract
                   [                                 // and a list of filters
                   [ "upTime", 99.995 ],             // minimum uptime:
                   [ "Cost", 0.0005 ],               // maximum cost:
                   [ "WXYZNumberAvailable" ],        // WXYZ info
                                                    //   available
```

-continued
```
                                                    // only send back the
                                                    // first result
                   [ "resultCount", 1]
                   ] ],
                // and send the results back here:
                resultList) { }; ];
                resultList[              // wait for results
                                         // that come as a list; grab the
                                         // first and
                                         // drop the rest, if any
                (<topResult^ | _ > : ~List) { } ] ;
                // and send to the result port that first result
                result [ ( ^topResult) { }];
        }
    }
}
```

The following represents raw XML results of compiling the above query from xSpresso to XML for transmission over the wire, e.g., what is actually to be sent over the wire and un-marshaled back into query form on the UDDI server. Note that these results only include the <clause> statement associated with the actual FindService query:

```
<clause>
    <list>
        <head>
            <literal>
                <string>FindService</string>
            </literal>
            <identifier>
                <designator>
                    <identity>32016D15-A15A-48C1-9EE5-5B63A863E93E</identity>
                    <tag>theContract</tag>
                </designator>
            </identifier>
            <list>
                <head>
                    <list>
                        <head>
                            <literal>
                                <string>upTime</string>
                            </literal>
                            <literal>
                                <double>99.995</double>
                            </literal>
                        </head>
                    </list>
                    <list>
                        <head>
                            <literal>
                                <string>cost</string>
                            </literal>
                            <literal>
                                <double>0.0005</double>
                            </literal>
                        </head>
                    </list>
                    <list>
                        <head>
                            <literal>
                                <string>WXYZNumberAvailable</string>
                            </literal>
                        </head>
                    </list>
                    <list>
                        <head>
                            <literal>
                                <string>resultCount</string>
                            </literal>
                            <literal>
                                <int>1</int>
```

```
                    </literal>
                </head>
            </list>
        </head>
    </list>
    <port>
        <designator>
            <identity>654D9457-A59C-4ACF-9355-83FB27845F01</identity>
            <tag>resultList</tag>
        </designator>
    </port>
</head>
</list>
<subjectivity>
    <name>
        <identity>36AB8608-C509-4F1C-9724-E00E0E551177</identity>
        <tag>List</tag>
    </name>
</subjectivity>
</clause>
```

Returning to FIG. 4, the web services search engine 406 has access to contract data and reputation data for a number of web service servers $408_1$-$408_n$ that provide web services contract offerings $410_1$-$410_n$, and when queried, crawls the contract data looking for servers that match the client's contract requirements. Preferably, the contract data, and possibly some or all of the servers' reputation data, is background loaded and cached on the web services search engine 406, so that queries can be quickly processed from the cached view of web services and reputations.

In accordance with an aspect of the present invention, the web services search engine 406 also crawls the cached reputation data looking for servers that match the client's reputation requirements. Note that if none match after contract and/or reputation crawling is complete, the web service search engine 406 can return a message to the client code 402, e.g., indicating that to obtain a result, the client 402 needs to broaden its requirements.

As described above, reputation may be based on many factors, and reputation data may be obtained from many sources. For example, the web service servers $408_1$-$408_n$ can themselves advertise their reputation by providing data $412_1$-$412_n$, to an auditor 414. The client 402 can also provide reputation data 416, including the responsiveness actually observed, to the auditor 414. Other parties, such as other clients, independent evaluation services (critics and reviewers) and other interested entities can also provide reputation data 418 to the auditor 414. The auditor correlates the reputation data from the various sources and provides the correlated data 420 to the web services search engine 406, which caches the data for crawling when needed to match a client's reputation requirements.

By way of example, web services may advertise their guarantees, which may be crawled and cached by any number of different, independent service auditors, e.g., companies that already rate businesses, provide credit scores, provide digital trust services signatures, and/or review products. The auditor can also compare the service's advertised technical results with the actual technical results observed by thousands or millions of consumers of the service. As an added benefit, having independent, trusted auditors also provides anonymity to the companies or individuals who provide the data.

Each of the sources of reputation data may themselves have a reputation, which factors into the value of each source's reputation data provided to the auditor. For example, a single set of reputation values from which a score can be determined that is obtained from a trusted, independent third party reviewer may be give more weight than thousands of scores obtained from a questionable source. Note that having multiple, competing, independent auditors will pressure the auditors to be trustworthy, and indeed, consumers of web services and search engine providers can employ a reputation score for various auditors, based on their own experiences, to determine which auditors are best for the consumer.

Returning to FIG. 4, when the contract and reputation crawling is complete, a (temporary) ranked list 422 is constructed at the web services search engine 406, thereby ordinarily providing a manageable subset of web service servers. As can be appreciated, virtually any ranking algorithm 424 may be used, including a straightforward one that sums the products of per-category reputation scores returned by the auditor multiplied by a client weight provided for each category (e.g., responsiveness may be one reputation category score, uptime another, cost another and so on):

Service's score=(category1 score*client weight for category1)+(category2 score*client weight for category2)+ ... (categoryX score*client weight for categoryX).

Once the web services search engine 406 has built the ranked list 422, the web services search engine 406 may perform a number of tasks to further process the list, such as to communicate with the top-ranked web service servers to establish that they are still available to provide the requested service, and/or to communicate with the auditor to confirm that the reputation data for each top-ranked web service server is still correct. For example, a web-service may fluctuate in its reputation based on its server's current load, that is, if not too busy, the service is highly rated, but if busy, the service is poorly rated. Since loads can quickly vary, the auditor can be contacted in near real time to obtain more up-to-date the reputation data for top-ranked candidates, and if necessary, readjust some or all of the top-ranked web services on the list, to add, remove, re-order and so forth.

Ultimately, if at least one web service server matches the contract and reputation requirements, then the web service search engine 406 returns a ranked list 426 of providers (e.g., links thereto or the like) which implement the specific web service to the client 402 in response to the query 404. Note that the search engine 406 may return only the top-ranked provider, however the client may prefer to select one from a list of several top-ranked ones. For example, the client may have other criteria not necessarily in the reputation schema, such as based on the client's own experiences or preferences, e.g., never use a particular server's web service regardless of its rank, favor one over another regardless of rank, and so forth.

In general, the web service search engine 406 performs the crawling to filter the amount of data (the size of the list) that is returned in the ranked list 426 to the client 402. However, it should be noted that at least some of the filtering may be performed by the client 402, beyond selecting one from a list. For example, (assuming anonymity is not always an issue), the web services search engine 406 may provide a set of scores for each provider, such as corresponding to some of the possible factors used in establishing the score, e.g., responsiveness, latency, uptime, cost, financials, audits, privacy and/or references. Such separate scores might be useful to the client in making a final selection, for example when the sorted list 422 included a number of very closely-ranked servers, and/or the client was unable to provide a query that was sufficiently narrow for the client's liking, instead desiring to do some of its own post-result filtering.

Figure 5:
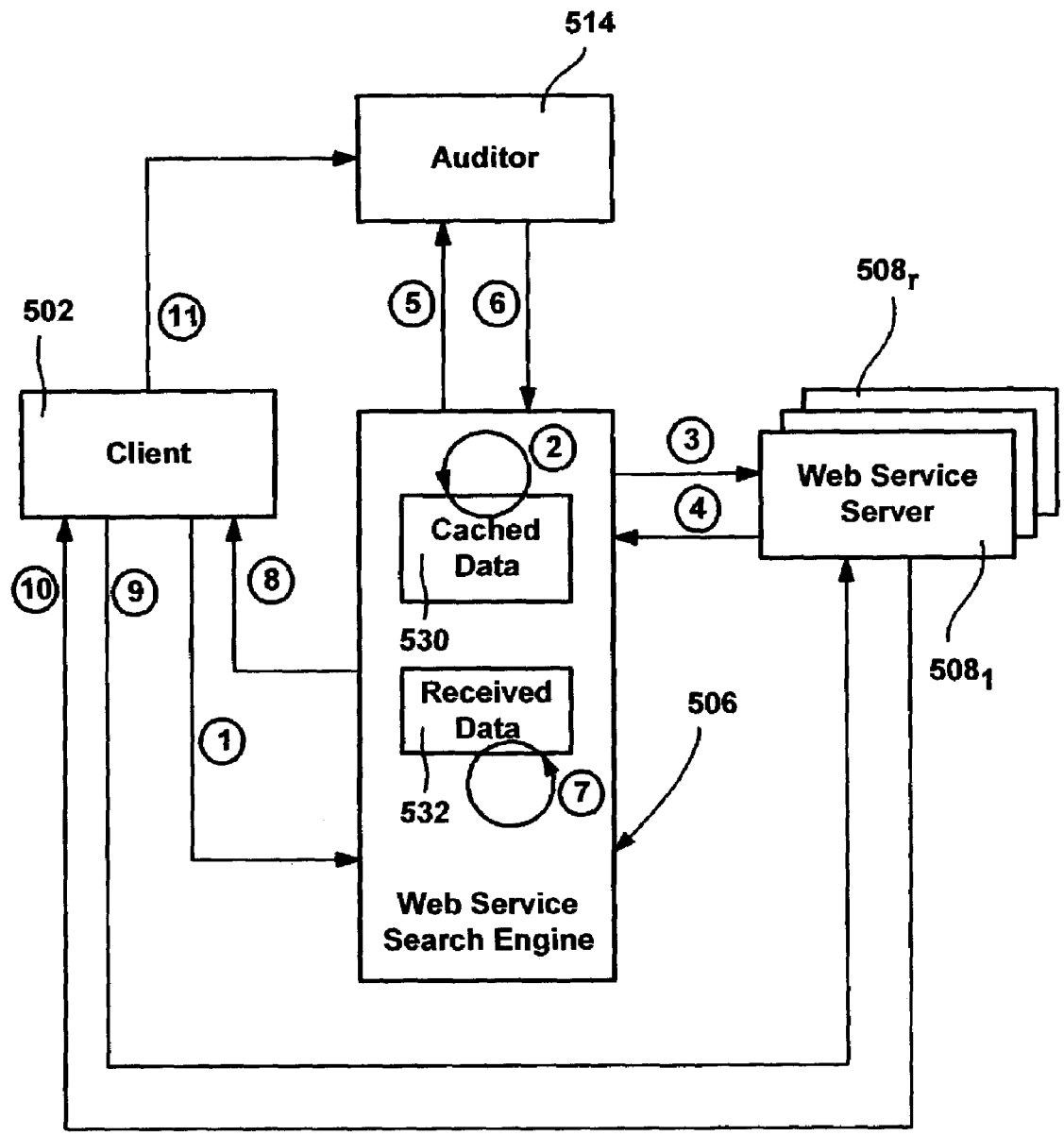
FIG. 5 is a block diagram generally representing a timing scenario for automatically locating web services based on reputation data, in accordance with an aspect of the present invention.

FIG. 5 represents the general timing of how an implementation similar to that shown in FIG. 4 may operate. In general, a client 502 initiates the process by sending a web-services query requesting a ranked list of web service providers to the web service search engine 506, as represented in FIG. 5 by the arrow labeled one (1). As described above, the query includes contract and reputation requirements.

As also described above, the web service search engine 506 crawls cached data 530 to match the contract requirements and reputation requirements with the providers, as represented in FIG. 5 by the arrow labeled two (2). This typically results in a more manageable subset that can be ranked and verified, e.g., top-ranked providers may number in the tens instead of the hundreds of thousands. Note that this subset of top-ranked providers may be somewhat larger than the list that will be returned to the client 502, in case subsequent verification processing changes the rank order; e.g., if the client wants a list of the ten top-ranked providers, the subset may be twenty or so, to further process into the top ten.

For each top-ranked provider in the ranked list, the web service search engine 506 may choose (e.g., based on a timestamp in the cache) to communicate with the provider's corresponding server (e.g., $508_1$) to ask it for references, confirmation and so on, generally to ensure that the servers $508_1$-$508_r$ are operational and still perform as advertised with respect to the requested service, at least from the server's perspective. These communications is generally represented in FIG. 5 by the arrows labeled three (3) and four (4).

The web service search engine 506 also may choose (e.g., based on a timestamp in the cache) to communicate with an auditor 514 to confirm from the auditor's perspective whether each provider's advertised data corresponds to the auditor's current data, which was aggregated from possibly disparate sources, e.g., other clients, independent measurements, other reviewers and the like as generally described above. This communication is generally represented in FIG. 5 by the arrows labeled five (5) and six (6). Regardless of whether the servers are contacted, such a communication with the auditor 514 enables the client to receive a list based on reputation data that is very up-to-date, since with many millions of web services the cached reputation data for a given web service may be obsolete relative to fast-changing data, such as responsiveness data which varies by a server's current load. The search engine 506 may update its cached reputation data for each web service for which reputation data is received from the servers and/or auditor.

With the data 532 received from the servers and auditor 514, the web service search engine 506 processes the received data 532 to correlate it with the list, as generally represented in FIG. 5 by the arrow labeled seven (7). This may result in the initial order of rankings being modified, including rearranging the orderings, dropping one or more providers from the list, and so on. Note that if the search engine 506 needs more providers to complete the list, and/or is unsatisfied with the results, the search engine can obtain data on other providers that were in its initial ranking but not previously selected for individual reference confirmation (via arrows three (3) through six (6) in FIG. 5). For example, after communicating with each of the servers and/or auditor as described above, the web service search engine 506 may observe that some or all of the reputation scores dropped below the initial reputation scores others that were never individually confirmed, and thus may decide that current data for some of these other providers should be obtained, in order to provide the client with a better list.

Once the final list is arranged following the processing, the list is returned to the client, as generally represented in FIG. 5 by the arrow labeled eight (8). The client 502 then selects a provider from the list, and binds to its corresponding server (e.g., the server $508_1$, in FIG. 5) to have the service performed. This communication is generally represented in FIG. 5 by the arrows labeled nine (9) and ten (10). Following performance of the service, the client 502 then reports the relevant reputation data, e.g., the observed performance results, to the auditor 514, as represented in FIG. 5 by the arrow labeled eleven (11). The auditor 514 aggregates the result data, e.g., by weighing it based on the client's reputation and mathematically combining the weighted value with other input for this particular provider.

Figure 6:
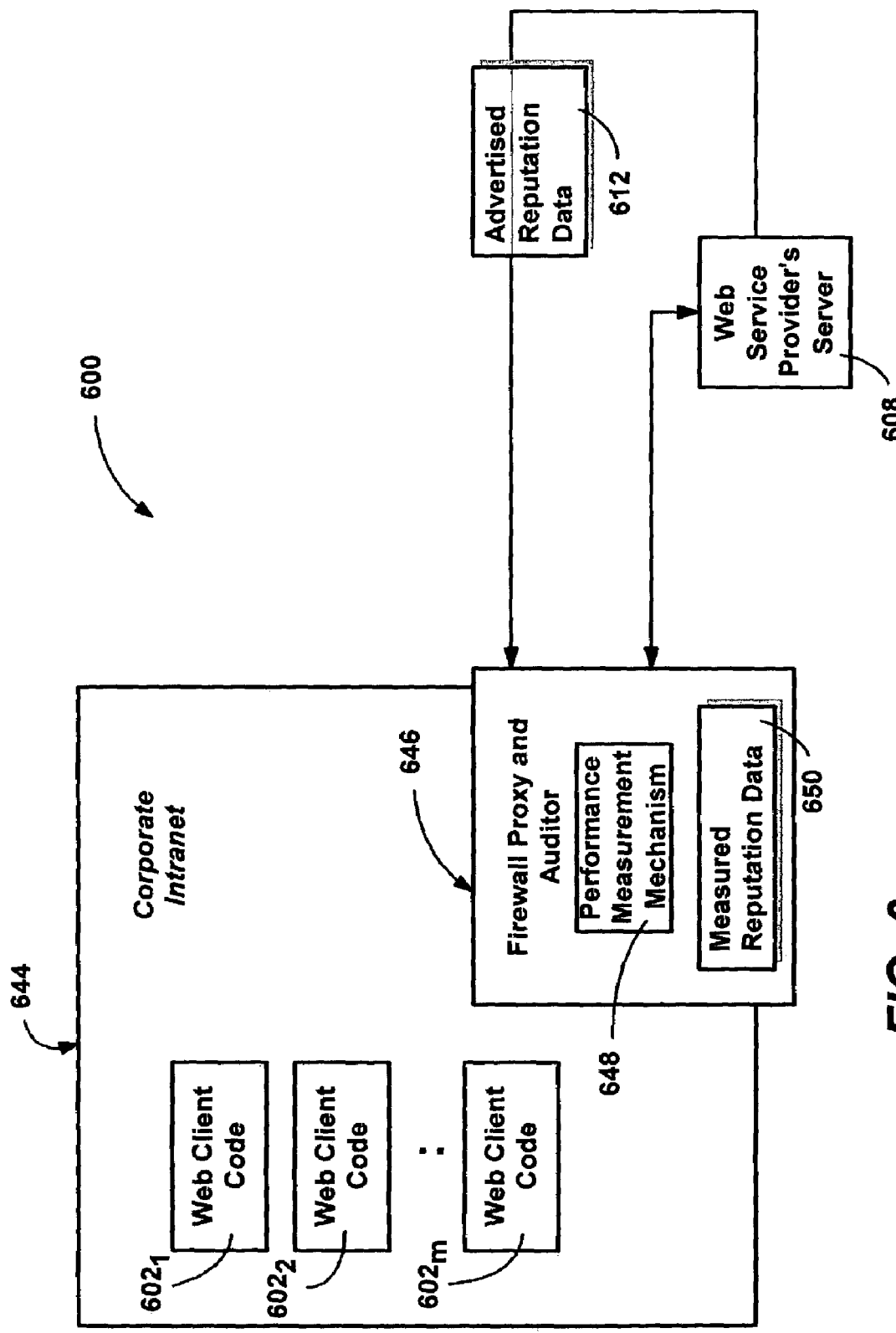
FIG. 6 is a block diagram generally representing a web services environment, including a corporate intranet with components for automatically collecting reputation data, in accordance with an aspect of the present invention.

FIG. 6 represents another alternative example implementation of a distributed reputation system 600 arranged in accordance with an aspect of the present invention, such as for an enterprise environment. In FIG. 6, a corporate intranet 644 includes a number of consumers, such as web client code $602_1$-$602_m$. A corporate proxy/firewall 646 is coded with a performance measurement mechanism 648 to observe the difference between the advertised technical (reputation) results 612 received from a web service provider 608, and the actual, measured technical results 650.

In this implementation, each enterprise may become its own miniature auditor of the advertised reputations of the web service providers. Note that business employees have no expectations of privacy from observed (logged) behaviors on internal corporate networks. The system administrators of specific line-of-business applications can use such a mechanism to be alerted to failures of external companies to live up to their service agreements, and redirect their internal client code to use competing web services as necessary (or perhaps even in an automated fashion as a failsafe). Further, note that some or all of the web service providers may be internal to the corporate intranet 644, and an administrator can quickly learn which of the internal providers are better than others.

As can be readily understood, the alternative implementation shown in FIG. 6 can be combined with the alternative implementation shown in FIG. 4. For example, the measured reputation data 650 (FIG. 6) can be used to select one service from the ranked list 426 returned by the search engine 406 (FIG. 4). Also, the enterprise may forward its external web service measured observations 650 to the independent external service auditor 514 (and possibly other auditors) for aggregation with the whole, possibly in exchange for a discount for future queries of other web services, or as a requirement for obtaining global data.

In keeping with the present invention, the aggregation of the reputation data across the entire web (or a sufficiently large network) mitigates any deceptive or misleading data by requesters or providers, since a large statistical sample will cancel out any extremes. The aggregate data also allows consumers (e.g., enterprises) to make informed decisions on whether the observed behaviors were an aberration due to some activities outside the control of a web service. For example, a local break in a communications link impacts a local observed latency, but not the globally observed latency.

Figure 7:
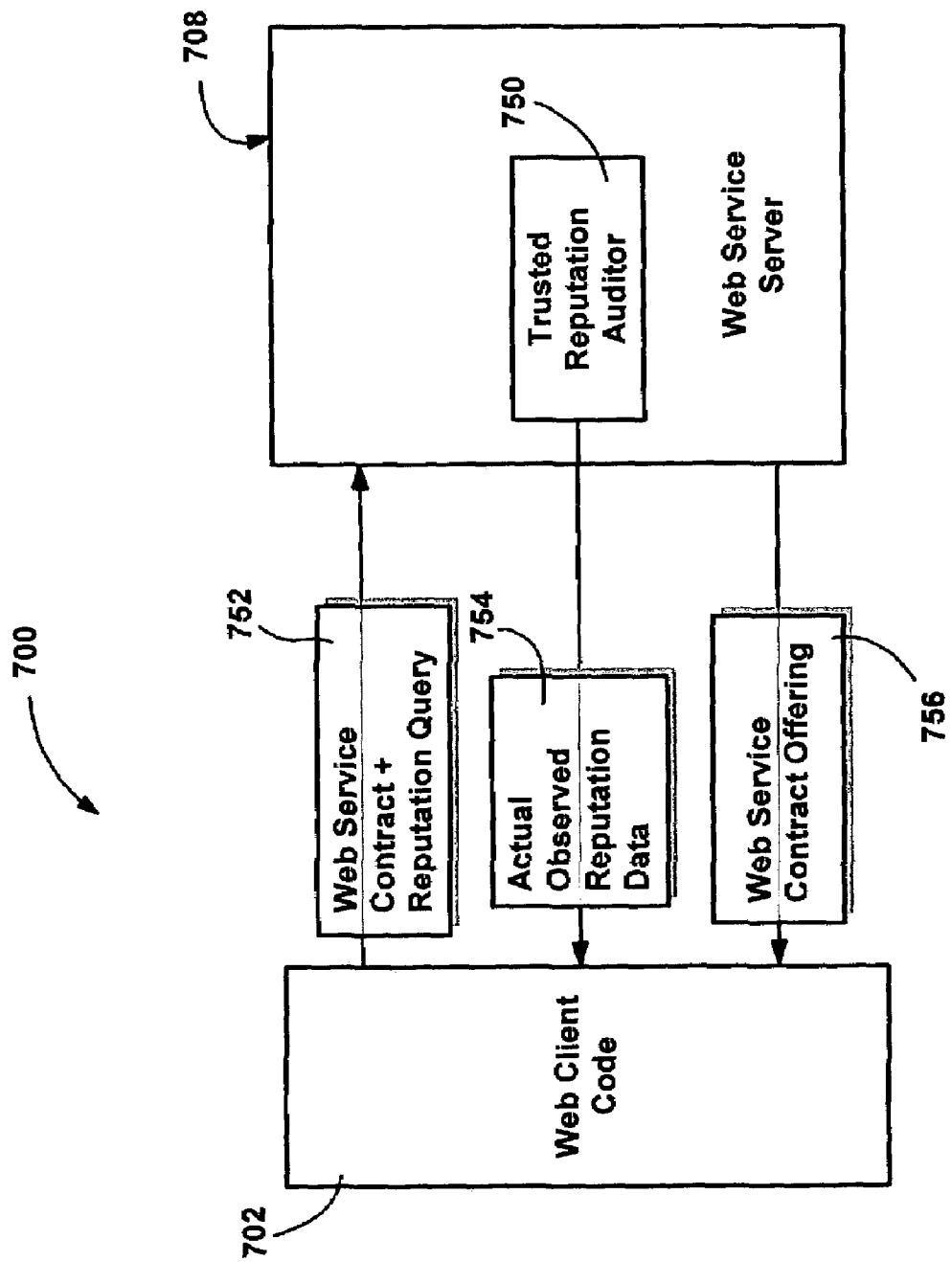
FIG. 7 is a block diagram generally representing a web service server that provides reputation data to a requester client in accordance with an aspect of the present invention.

FIG. 7 shows another alternative implementation 700, in which a web service server 708 internally runs a trusted auditor 750. In response to a query 752, (which may be sent to an intermediate search engine, not shown), the web service server 708 returns actual reputation data 754 measured by the trusted auditor along with the contract offering 756. The trusted auditor may alternatively (or in addition) report to a larger, independent auditor, such as those represented in FIGS. 4 and 5.

As can be readily appreciated, in the implementation of FIG. 7 the web service server 708 essentially acts as its own auditor. The trustworthiness of such a model can be ensured in a number of ways. For example, a reputable web service provider can assert that it runs independent or completely truthful auditor code 750 unmodified, and reports the data as is. External audits, client measurements and so on may verify this, and a large company with a good reputation would not that reputation damaged by tampering with the code or the actual results.

As another example of a way that honest internal auditing may be enforced is to run the auditing code in trusted space. More particularly, operating systems and hardware are capable of running code and storing data in trusted space that cannot be tampered with. By having the internal auditor 750 effectively out-of-reach by the system administrator of the service, the operating system can provide an unbiased view as to how the web service is actually performing.

Yet another example of a trusted auditor is when the client and the provider are essentially owned by the same entity, such as in a corporate network, home network, or with interconnected hardware or software resources. In such an environment, the provider has no incentive for misleading the client, since both are the same entity.

By way of example, consider a client that wants to run an application on one ore more available computing devices. With distributing operating system services across a variety of devices associated with the client's identity, empirical data may be collected for the reliability, performance and other reputation of hardware. Assuming other selection factors to be essentially equal, e.g., various available machines have sufficient capacity and processing speed, the user would want to run the distributed parts of an application or web service on those machines that have a high reputation for reliability.

Further, the present invention scales up to handle large numbers of services as described above, but can also scale down to the level of individual hardware or software components. Note that reputation at this level may have a different set of metrics, e.g., software with clean, well-defined interfaces, rich contracts descriptions, reasonably good documentation, external community following and so forth will have a better reputation than those with lesser scores for those categories. Similarly, an unreliable hardware device will not ordinarily be a user's first choice for interconnecting to another hardware device, when a user has a choice of devices available. This data can be cached as reputation data on the central device (e.g., a personal computer) that the user is using to interconnect devices, or obtained from elsewhere.

As can be seen from the foregoing detailed description, there is provided a method and system for automating the selection of a web service based on reputation data. The system and method may rank web services based on a reputation scores, thereby facilitating the selection of one when a large number of web services match a client's other requirements. The present invention also scales to facilitate the selection of web services from lesser numbers, such as when dealing with internal software components, and hardware devices and components. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment in which web services are used to provide computing services to clients via protocols and cross-platform standards, a system for finding and ranking web services in a manner that matches web services with a consumer's computing service needs, and which is not significantly influenced by popularity data or other manipulable data of a web service, the system comprising:

a listing mechanism that identifies a plurality of web services, each of the web services operable to provide interoperative functionality to the system;

an auditor that collects reputation data that corresponds to schematized behavioral attributes for the plurality of web services, the behavioral attributes including technical attributes of the web service unrelated to web service popularity, including at least web service responsiveness, wherein web service responsiveness is a measure of how often a web service reads from a specific port; and a selection mechanism for matching one or more web services to a consumer's needs, the selection mechanism being adapted to narrow the plurality of web services identified by the listing mechanism, based on the reputation data, including at least the technical attributes, provided by the auditor, into a subset that identifies at least one web service, wherein the technical attributes used to narrow that plurality of web services include empirical data on at least web service responsiveness, and excludes attributes, including popularity data, that are susceptible to manipulation by provides of the plurality of web services, and instead includes technical attributes that are resistant to manipulation;

wherein the selection mechanism includes a server component that returns a list of at least two web services as the subset to a requesting client;

wherein the selection mechanism includes a client component that further narrows the list into a single selected web service.

2. The system of claim 1 wherein the listing mechanism comprises a UDDI web service search engine and wherein the plurality of web services comprises a plurality of UDDI defined web services.

3. The system of claim 1 wherein the subset identifies a single selected web service.

4. The system of claim 1 wherein the selection mechanism includes a ranking mechanism that ranks each web service in the subset into an order based on the reputation data.

5. The system of claim 1 wherein the selection mechanism determines a score for each web service in the subset based on the reputation data.

6. The system of claim 1 wherein the auditor collects reputation data from a plurality of web service providers.

7. The system of claim 1 wherein the auditor executes within an intranet and measures actual performance of web services.

8. The system of claim 1 wherein the auditor executes on a server that provides a web service.

9. The system of claim 1 wherein the auditor comprises an independent entity with respect to the listing mechanism and each provider of each web service in the subset, and wherein the auditor is accessible via a network connection.

10. The system of claim 1 wherein the auditor collects reputation data from a plurality of reviewers.

11. The system of claim 10 wherein the reviewers comprise clients that request the web services.

12. The system of claim 1 wherein the technical attributes used to narrow the plurality of web services further comprise web service latency information.

13. The system of claim 1 wherein the technical attributes used to narrow the plurality of web services further comprise web service uptime information.

14. The system of claim 1 wherein the reputation data used to narrow the plurality of web services comprises business-oriented attribute data.

15. The system of claim 1 wherein the reputation data used to narrow the plurality of web services comprises web service cost information.

16. The system of claim 1 wherein the reputation data used to narrow the plurality of web services comprises information representing a solvency level of a provider of a web service.

17. The system of claim 1 wherein the reputation data used to narrow the plurality of web services comprises information representing an external business auditor of a provider of a web service.

18. The system of claim 1 wherein the reputation data used to narrow the plurality of web services comprises information representing a privacy policy of a provider of a web service.

19. The system of claim 1 wherein the reputation data used to narrow the plurality of web services comprises information representing certificate data of a provider of a web service.

20. The system of claim 1 wherein the reputation data used to narrow the plurality of web services comprises technically-oriented attribute data and business-oriented attribute data.

21. The system of claim 1 wherein the reputation data used to narrow the plurality of web services is categorized into a set of scores, and wherein the selection mechanism determines a ranking score for each web service in the subset based on the set of scores and at least one weight value corresponding to at least one of the scores.

22. The system of claim 21 wherein a client provides each weight value in a query to a server.

23. The system of claim 1 wherein the reputation data used to narrow the plurality of web services is categorized into a set of scores, and wherein a requesting client indicates reputation requirements for at least one of the scores in a query to a server.

24. In a computing environment for providing web services which provide computing services to clients via protocols and cross-platform standards, a method for finding and ranking web services in a manner that matches web services with a consumer's computing service needs, and which is not significantly influenced by popularity data or other manipulable data of a web service, the method comprising:
receiving a query for web service data, the query including request data comprising at least one basic operating requirement and at least one reputation requirement that corresponds to at least one schematized behavioral attribute for a web service, the at least one schematized behavioral attribute of the reputation data including at least one technical attribute unrelated to web service popularity and which are resistant to manipulation and which relates to empirical data on a web service's responsiveness, wherein web service responsiveness is a measure of how often a web service reads from a specific port;
using the request data, including the technical attribute including the web service's responsiveness data, and excluding attributes, including popularity data, that are susceptible to manipulation by a provider of a web services, to locate a set of web services that meet each basic operating requirement and a subset of at least one web service that meets each reputation requirement, wherein each of the web services are operable to provide interoperative functionality to the systems; and
wherein the query is received at a search engine from a client, and wherein returning the subset in response to the query comprises returning a list to the client;
wherein the list includes at least two web services, and further comprising, at the client, receiving the list and selecting a web service from the list;
returning the subset in response to the query.

25. The method of claim 24 wherein the query is received at a search engine, and further comprising, at the search engine, crawling cached contract data to locate the set of web services that meet each basic operating requirement.

26. The method of claim 25 further comprising, at the search engine, crawling cached reputation data to locate the subset of web services that meet each reputation requirement.

27. The method of claim 24 further comprising, communicating with a provider of a web service identified in the subset to verify that the provider meets each basic operating requirement and each reputation requirement.

28. The method of claim 24 further comprising, communicating with an auditor to verify that a provider of a web service identified in the subset meets each basic operating requirement and each reputation requirement.

29. The method of claim 24 wherein the subset identifies at least two web services, and further comprising, ranking each web service in the subset into an order based on collected reputation data.

30. The method of claim 24 further comprising determining a score for each web service in the subset based on collected reputation data.

31. The method of claim 24 further comprising, collecting reputation data from a plurality of reviewers.

32. The method of claim 24 further comprising, collecting reputation data from a web service provider.

33. The method of claim 32 wherein collecting reputation data from the web service provider comprises measuring actual performance of a web service corresponding to the provider.

34. The method of claim 33 wherein measuring the actual performance comprises measuring web service responsiveness.

35. The method of claim 34 wherein measuring web service responsiveness comprises determining how often a web service reads from a specific port.

36. The method of claim 33 wherein measuring the actual performance comprises measuring web service latency.

37. The method of claim 36 wherein the at least one technical attribute further includes web service latency, and wherein measuring web service latency comprises determining a guaranteed not-to-exceed latency for the results of a specific operation.

38. The method of claim 33 wherein the at least one technical attribute further includes web service uptime measuring the actual performance comprises measuring web service uptime.

39. The method of claim 38 wherein measuring web service uptime comprises observing how often a site or device is available.

40. The method of claim 38 wherein measuring web service uptime comprises observing what time of day a web service is unavailable.

41. The method of claim 24 wherein the request data comprises categorized weight data corresponding to at least some categories of scores corresponding to reputation data for each web service, and wherein using the request data comprises applying the weight data to the scores to determine a resultant score for each web service.

42. A computer-readable storage medium having computer-executable instructions for performing the method of claim 24.

43. In a computing environment in which web services are used to provide computing services to clients via protocols and cross-platform standards, a method for finding and ranking web services in a manner that matches web services with a consumer's computing service needs, and which is not significantly influenced by popularity data or other manipulable data of a web service, the method comprising:
maintaining information that identifies a plurality of web services, each web service operable to provide interoperative functionality to a computer system;
obtaining reputation data that corresponds to schematized behavioral attributes for the plurality of web services, the at least one schematized behavioral attribute of the reputation data including at least one technical attribute unrelated to web service popularity, which is resistant to manipulation, and which relates to empirical data on at least a web service's responsiveness, wherein web service responsiveness is a measure of how often a web service reads from a specific port; and
selecting a subset from the plurality of web services based on the reputation data, and excluding attributes, including popularity data, that are susceptible to manipulation by providers of the plurality of web services, and instead including the empirical data on responsiveness, the subset comprising at least one web service;
wherein the selecting includes a server component that returns a list of at least two web services as the subset to a requesting client;
wherein the selecting includes a client component that further narrows the list into a single selected web service.

44. The method of claim 43 further comprising, receiving a request for the subset from a client, and returning the subset in response to the request.

45. The method of claim 43 further comprising, ranking each web service in the subset into an order based on the reputation data.

46. The method of claim 43 wherein selecting a subset comprises determining a reputation score for each web service in the subset.

47. The method of claim 43 wherein obtaining reputation data comprises communicating with an auditor.

48. The method of claim 43 wherein obtaining reputation data comprises communicating with each provider of each web service.

49. The method of claim 43 further comprising collecting the reputation data.

50. The method of claim 43 wherein collecting the reputation data comprises measuring actual performance of a web service.

51. The method of claim 43 further comprising, verifying the reputation data.

52. A computer-readable storage medium having computer-executable instructions for performing the method of claim 43.

53. In a computing environment in which web services are used to provide computing services to clients via protocols and cross-platform standards, a system for finding and ranking web services in a manner that matches web services with a consumer s computing service needs, and which is not significantly influenced by popularity data or other manipulable data of a web service, the system comprising,
a client that requests a web service;
a server that provides a web service corresponding to the requested web service, the web service operable to provide interoperative functionality to the client;
an auditor that collects reputation data that corresponds to at least one schematized behavioral attribute for the requested web service, the behavioral attributes including technical attributes of the web service, and the technical attributes being resistant to manipulation and including empirical data on at least web service responsiveness, wherein web service responsiveness is a measure of how often a web service reads from a specific ports; and
a UDDI search engine that receives the web service request from the client, identifies the server as corresponding to the requested web service, uses the reputation data, including the technical attributes relating to web service responsiveness, and excluding attributes, including popularity data, which are susceptible to manipulation by a provider of a web service, to select the web service from among other servers that provide web services that correspond to the requested web service, and returns an identifier of the server to the client in response to the request;
wherein the search engine returns the identifier in a list of identifiers to the client, each identifier corresponding to a server that provides a web service that corresponds to the requested web service;
wherein the list of identifiers corresponds to a narrowed subset of the other servers that provide web services that correspond to the requested web service.

54. The system of claim 53 wherein the list of identifiers is ranked according to the reputation data.

55. The system of claim 53 wherein the client reports reputation data to the auditor.

56. The system of claim 53 wherein the server provides reputation data to the auditor.

57. The system of claim 53 wherein the search engine caches the reputation data.

58. The system of claim 53 wherein the search engine communicates with the auditor to receive the reputation data.

59. The system of claim 53 wherein the search engine communicates with the auditor to verify the reputation.

* * * * *